US007903109B2

(12) United States Patent
Rurin

(10) Patent No.: US 7,903,109 B2
(45) Date of Patent: Mar. 8, 2011

(54) METHOD AND SYSTEM FOR VISUALIZATION OF VIRTUAL THREE-DIMENSIONAL OBJECTS

(76) Inventor: Oleg Stanislavovich Rurin, Moscow (RU)

( * ) Notice: Subject to any disclaimer, the term of this patent is extended or adjusted under 35 U.S.C. 154(b) by 315 days.

(21) Appl. No.: 12/090,254

(22) Filed: Apr. 14, 2008

(65) Prior Publication Data

US 2010/0007657 A1    Jan. 14, 2010

Related U.S. Application Data

(63) Continuation of application No. PCT/RU2005/000465, filed on Sep. 15, 2005.

(51) Int. Cl.
*G06T 15/00* (2011.01)
*G06F 3/033* (2006.01)
*G06F 3/02* (2006.01)
*G09G 5/08* (2006.01)
*G09G 5/00* (2006.01)

(52) U.S. Cl. ......... 345/419; 345/158; 345/169; 345/632; 345/633

(58) Field of Classification Search .................. 345/419, 345/632, 633, 158, 169
See application file for complete search history.

(56) References Cited

U.S. PATENT DOCUMENTS

| | | | | | |
|---|---|---|---|---|---|
| 5,490,784 | A | * | 2/1996 | Carmein | 434/55 |
| 5,574,836 | A | | 11/1996 | Broemmelsiek | |
| 5,577,981 | A | | 11/1996 | Jarvik | 482/4 |
| 5,793,483 | A | * | 8/1998 | Zehnpfennig et al. | 356/139.03 |
| 6,005,548 | A | * | 12/1999 | Latypov et al. | 345/156 |
| 6,064,335 | A | * | 5/2000 | Eschenbach | 342/357.06 |
| 6,159,100 | A | * | 12/2000 | Smith | 463/42 |
| 6,222,482 | B1 | | 4/2001 | Gueziec | |
| 6,535,232 | B1 | * | 3/2003 | Tsuda et al. | 715/849 |
| 6,597,347 | B1 | * | 7/2003 | Yasutake | 345/173 |
| 6,630,993 | B1 | * | 10/2003 | Hedges et al. | 356/141.4 |
| 7,035,897 | B1 | * | 4/2006 | Devereaux et al. | 709/203 |
| 2002/0022518 | A1 | | 2/2002 | Okuda et al. | |

(Continued)

FOREIGN PATENT DOCUMENTS

JP    9106409    4/1997

(Continued)

OTHER PUBLICATIONS

International Search Report of PCT/RU2005/000465 mailed Jun. 22, 2006. Search report in PCT/RU2005/000465, Jul. 29, 2008.

*Primary Examiner* — Xiao M Wu
*Assistant Examiner* — David T Welch
(74) *Attorney, Agent, or Firm* — Bardmesser Law Group

(57) ABSTRACT

A method of visualization of three-dimensional virtual objects in virtual space including (a) establishing a base coordinate system for a defined area of real space by placing, within the real space, a base group of ultrasonic transceivers that defines axes of a base coordinate system; (b) setting positions of the virtual objects in the virtual space relative to the base coordinate system a; (c) determining an observation point of a user relative to the virtual objects by locating a head ultrasonic transceiver mounted on a head of a user; (d) determining positions of multiple display units viewed by the user; (e) determining a position of the head ultrasonic transceiver relative to the base coordinate system; (f) determining positions of the transceivers mounted on the display units relative to the base coordinate system; (g) displaying the virtual objects on the multiple display units.

15 Claims, 7 Drawing Sheets

U.S. PATENT DOCUMENTS

Figure 1:
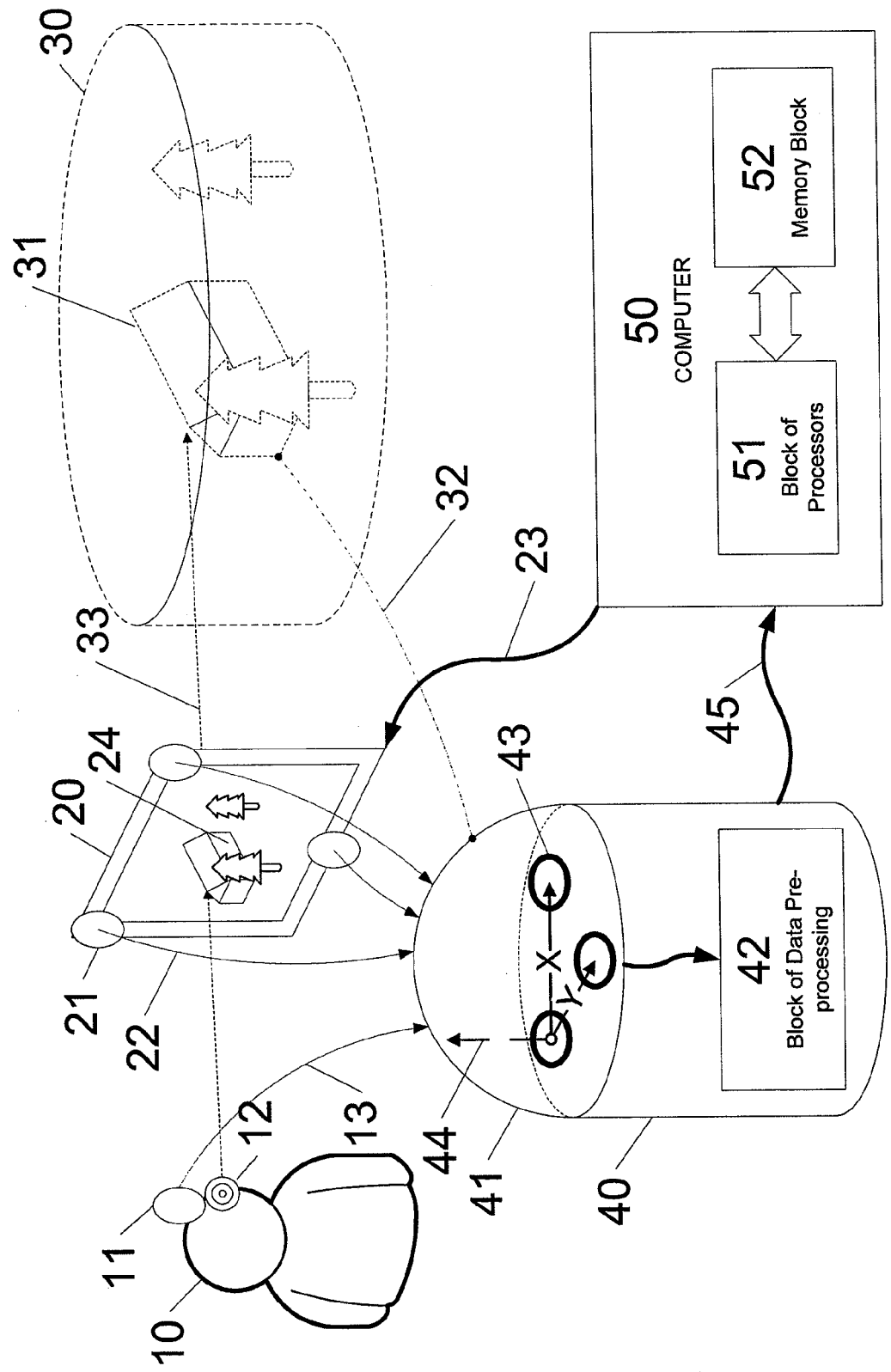

| | | | |
|---|---|---|---|
| 2003/0037101 A1* | 2/2003 | Torabi | 709/203 |
| 2003/0210228 A1* | 11/2003 | Ebersole et al. | 345/157 |
| 2004/0075735 A1 | 4/2004 | Marmaropoulos | |
| 2005/0283345 A1* | 12/2005 | Trabona | 703/1 |
| 2006/0031410 A1* | 2/2006 | Nagata et al. | 709/219 |

FOREIGN PATENT DOCUMENTS

| | | |
|---|---|---|
| JP | 9106409 A | 4/1997 |
| RU | 2106695 | 3/1998 |
| RU | 2106695 A1 | 3/1998 |
| WO | WO9635960 * | 11/1996 |

* cited by examiner

METHOD AND SYSTEM FOR VISUALIZATION OF VIRTUAL THREE-DIMENSIONAL OBJECTS

This is a continuation of International Application No. PCT/RU2005/000465 filed Sep. 15, 2005.

The invention refers to computer production engineering and can be used for creation, at the observer site, the effect of immersion in the virtual three-dimensional space seen on a monitor, a display or another image presentation device.

Many computer trainer-simulators and game programs require high quality of simulated space known as virtual three-dimensional (3D) space. If the virtual space is very similar to the reality, the process of transfer from the trainer-simulator to the real technical equipment at training, for example, cosmonauts, neurosurgeons and other professionals trained on dummies, becomes easier. Sportsmen, architects and gamers fond of 3D computer games, would be happy to have a means for high-grade visualization of those retro-screen objects with which they had to deal with.

The prior art includes various methods of enhancing reliability of stereoscopic pictures, including those based on the stereovision effect attained by means of special glasses (see patents U.S. Pat. No. 5,002,364 [1] and RU2152066 [2]) or by means of a special design of the screen (see patents—U.S. Pat. No. 4,649,425 [3], RU No2221350 [4] and publication PCT WO 9515662 [5]). Other solutions provided for 3D visualization of displayed objects, making impression of an object projecting from the virtual space into the real space (see patents—RU No2237283 [6], JP No11-250285 [7], US 36,088,035 [8]). Despite of complexity of applied devices, it was possible to project from the virtual space only some of the objects that did not allow achieving realistic display of the retro-screen space because of absence of depth or prospect of the space, and due to the restricted field of vision. For trainer-simulators these deficiencies are rather essential.

Another approach to the problem involves the use of a special helmet, which provides projection of a stereoscopic half-picture to each eye, but also allows changing a visual image of the virtual space at turning the helmet (see patents—RU No2106695 [9], RU 2128860 [10]). To expand the observer's opportunities special capsules or shells have been proposed wherein the observer surrounded by displays, was supposed to be placed for attaining the effect of plunging (submersion) into the virtual space, at that the continuous conversion of the virtual space following the real movements of an arm, a leg, a head, a trunk and an eye of the observer, took place. Such solutions essentially increase the realness of the observer's contact with the virtual space, however, complexity of the equipment for implementing these methods rather restricts the sphere of their application.

The solution most similar to the claimed invention is presented in the published US patent application No.2004/0,075, 735 [11]. It deals with method of establishing a kind of link between the observer located in the real space, and the objects of the virtual space, by means of determining the position (location) with the use of a set of sensors. Depending on the position of the observer his angle of view is calculated, and the images of the objects on the display vary corresponding to the prospect (depth) and a mutual disposition of the objects. The basic drawback of this solution consists in that it excludes a possibility of changing the spatial location of the display without changing the location of the objects of the virtual space. The said limitation is highly significant, for example, for users of mobile devices of which the displays can change the position at the owner's will. Transition from the situation "installation-observer" to "installation-display-observer" where each element possesses own freedom of movement, essentially modifies perception of the three-dimensional space and provides for the high quality effect of "plunging" into the virtual space.

The problem to be solved by the claimed invention consists in development of such method of visualization of virtual three-dimensional objects which would combine the effect of plunging into the virtual space and the simple implementation technique providing an opportunity of wide application of the new method.

The technical result consists in expansion of opportunities to observe the virtual space due to the following steps of:

establishing the base coordinate system for the preset area of the real space by stationing, within this space, the base group of receiving/transmitting devices, which group sets the position of axes of the base coordinate system;

setting the positions of the pre-produced in the digital format three-dimensional objects of the virtual space concerning the base coordinate system to ensure their virtual presence at within the preset area of the real space;

determining the user observation point of the three-dimensional objects of the virtual space concerning the base coordinate system by locating the receiving/transmitting device fixed on the user head and by setting the position of the observation point concerning the receiving/transmitting device fixed on the user head;

determining the position of the display units engaged by the user, concerning the base coordinate system by means of location of the receiving/transmitting devices fixed on the display units and also by means of setting the positions of working zones (active areas) of the display units concerning the receiving/transmitting devices fixed thereon;

generating a set of represented (displayed) data regarding the three-dimensional objects of virtual space, proceeding from the information regarding the positions of the three-dimensional objects of the virtual space concerning the base coordinate system, the information regarding the position of the observation point concerning the base coordinate system and the information regarding the positions of the display units engaged by the user concerning the base coordinate system;

displaying (representing) the three-dimensional objects of the virtual space on the display units engaged by the user, proceeding from the generated set of represented (displayed) data.

Unlike the mentioned above analogs and the prototype where, by default, the system of axes linked to the display plane, i. e. the working zone, is used, in the claimed solution the three-dimensional base coordinate system is created in the real space, for example, by means of a system consisting of, at least, three receiving/transmitting devices (RTD) with their preset mutual disposition and the preset spatial position of axes of the base coordinate system concerning these RTD. At that, each RTD serves as a reference point for a matching axis of coordinates which is an imaginary line passing both through the real and the virtual, i.e. retro-screen (behind the screen of the display), space. The assemblage of the virtual objects including digitized images of objects and parameters of their environment, including digital models of the three-dimensional objects, luminance, atmospheric features, etc., are soft-wise fixed, i.e. positioned, in the established (created) base coordinate system, to allows the observer located within the same coordinate system, watching the assemblage of the three-dimensional objects and the space surrounding them from different angles, i.e. at shift of the observation points.

Such points of observation and the virtual space visible from them depend on the mutual location, in the base coordinate system, of the observer, the display and the assemblage of the three-dimensional virtual objects; therefore it is necessary to ensure automatic determination of the position of these three elements in the base coordinate system. Thus it is obvious, that the essential role in visualization of virtual space belongs to the position of the observation point which can be arbitrary displaced, for example, at a turn of the observer's head. This problem is solved, in the simplest alternative, due to application of the system of locating with the help of active or passive means, for example, by disposing a group of basic RTD within the line-of-sight distance from the observer and the display. Such system allows establishing the flexible correspondence between the coordinates of the point of observation and the position of the display unit which can also change its position, thus enabling observation of panorama of the virtual space. In a more complex case, the system can include several displays thus enabling the observer to survey different sectors of the space.

The essence of the claimed method is illustrated by the pertinent drawings (see FIGS. 1 to 11).

Figure 2:
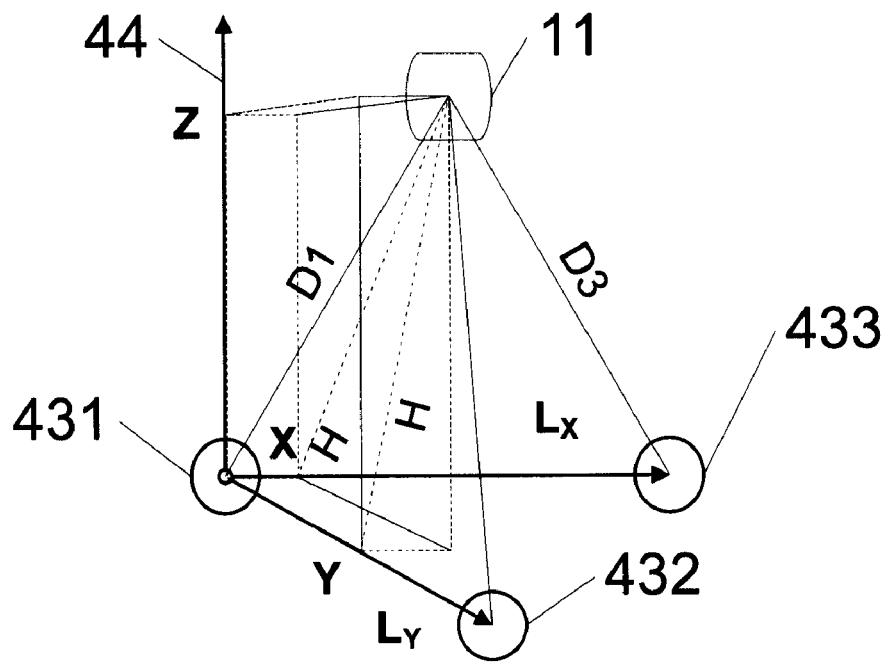
Figure 3:
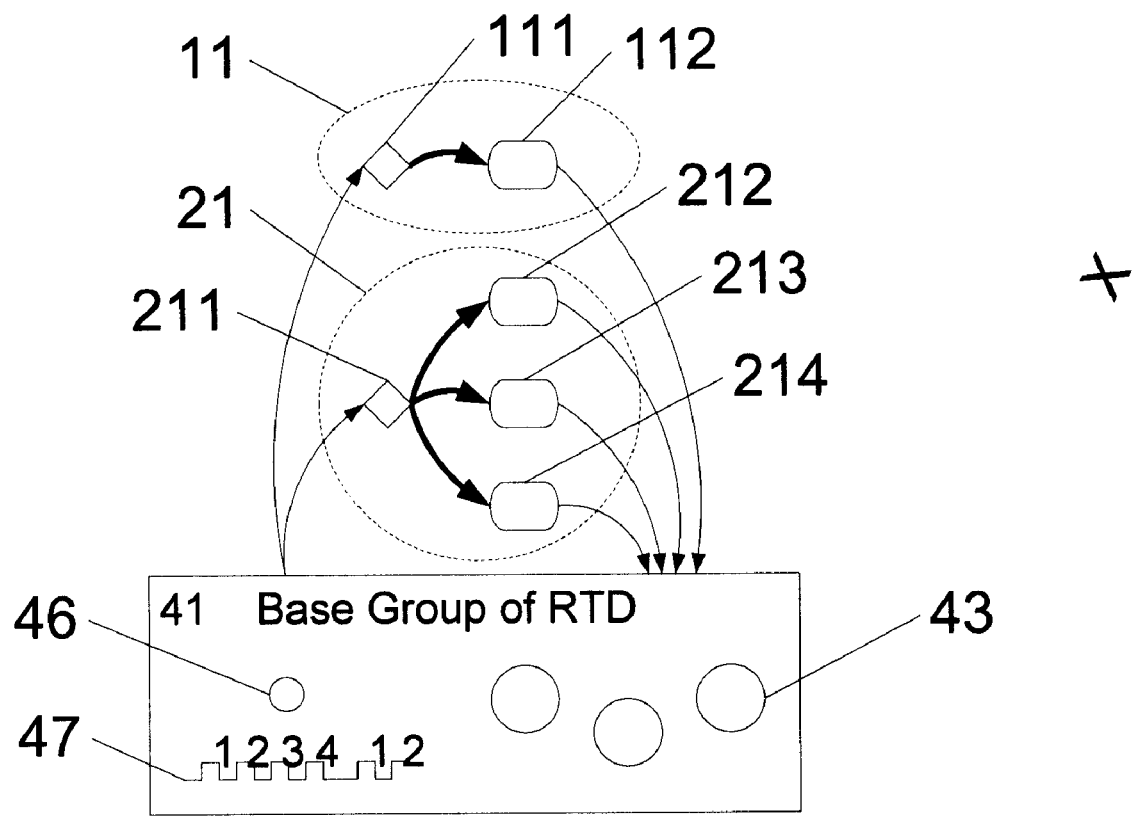
Figure 4:
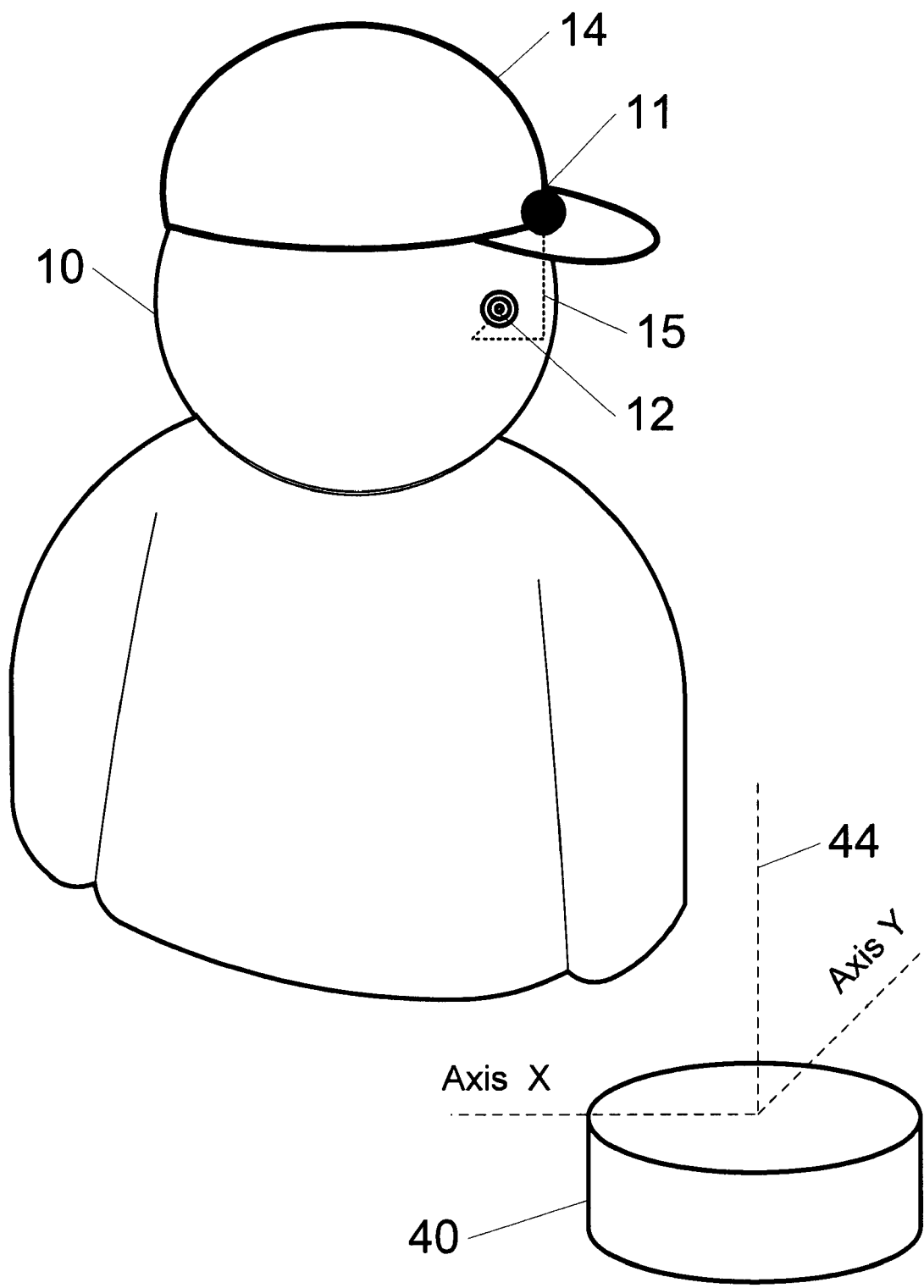
Figure 5:
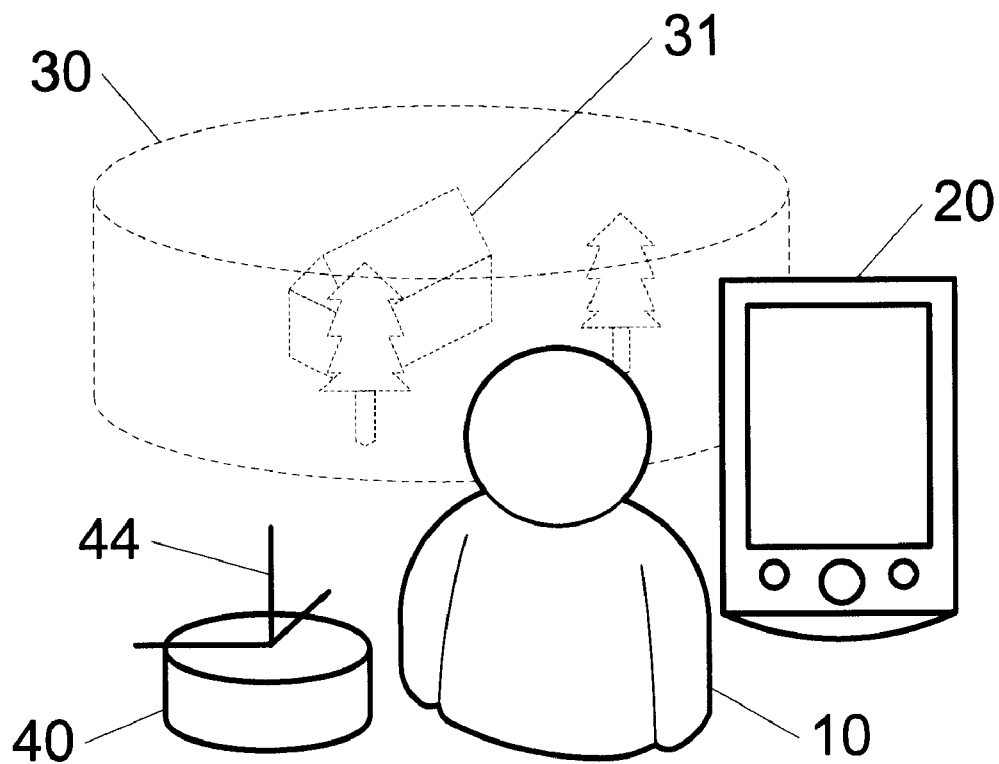
Figure 6:
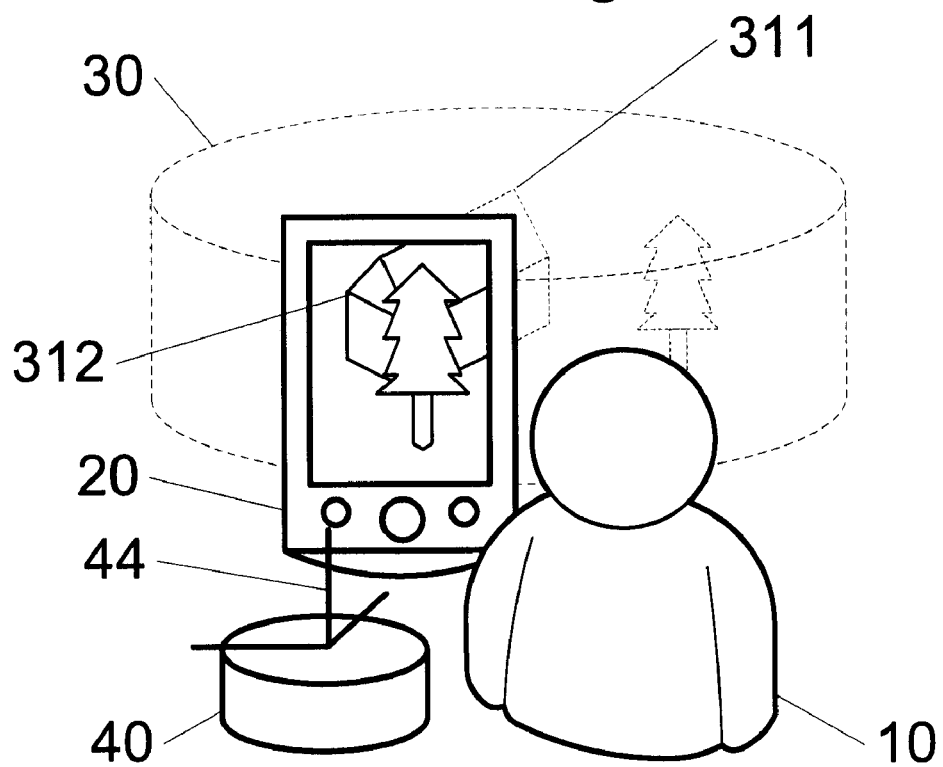
Figure 7:
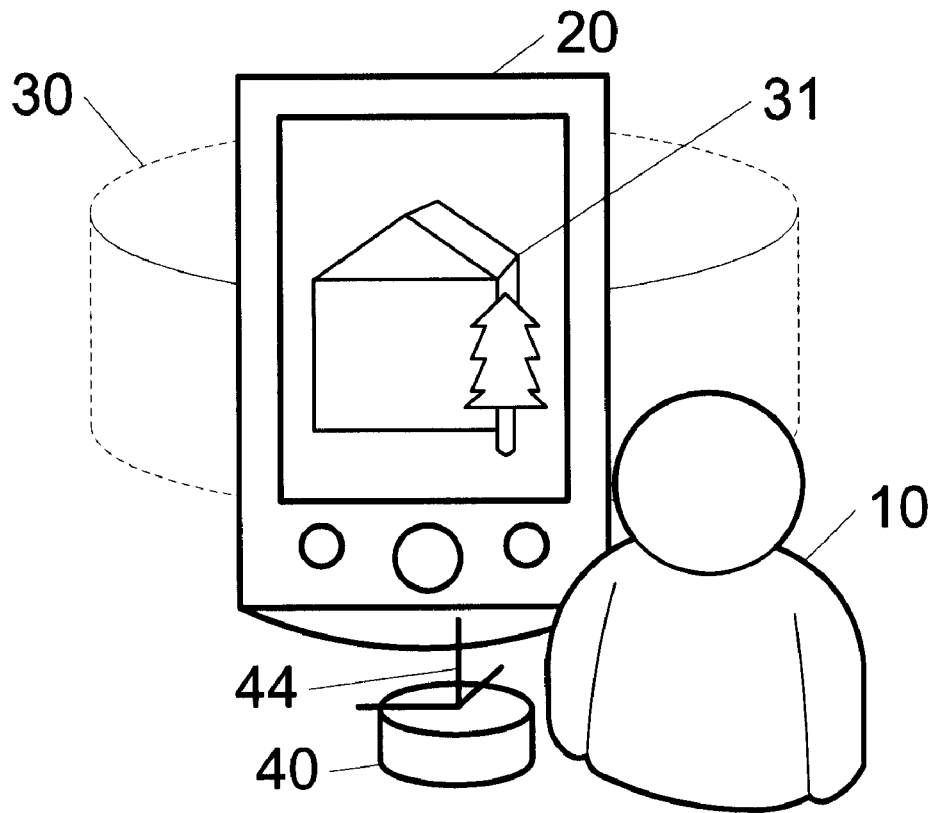
Figure 8:
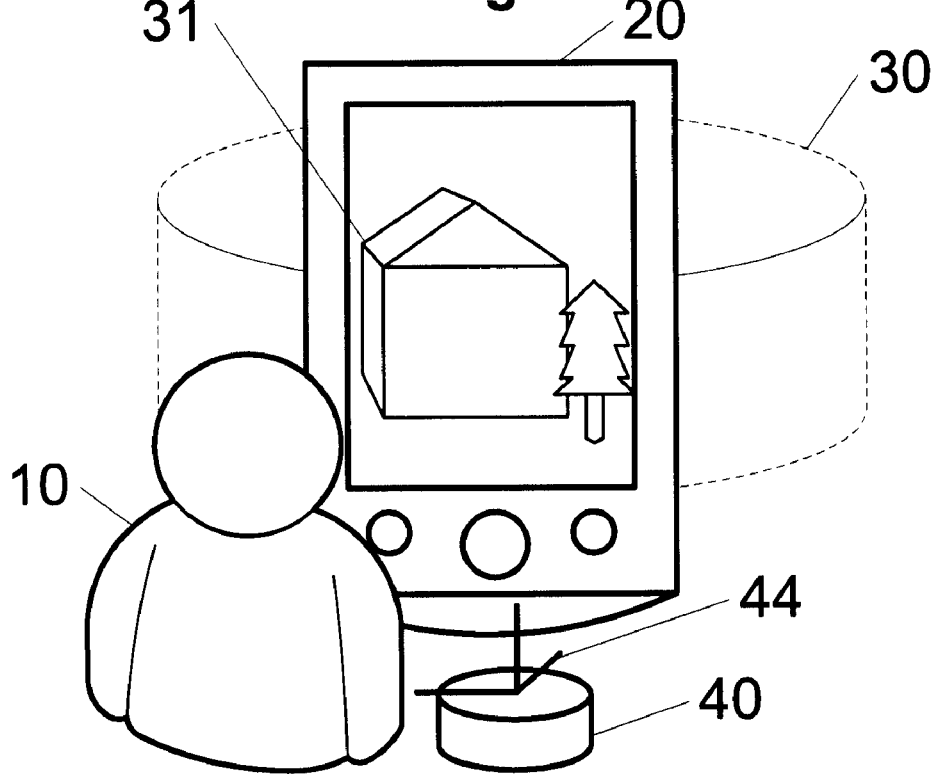
Figure 9:
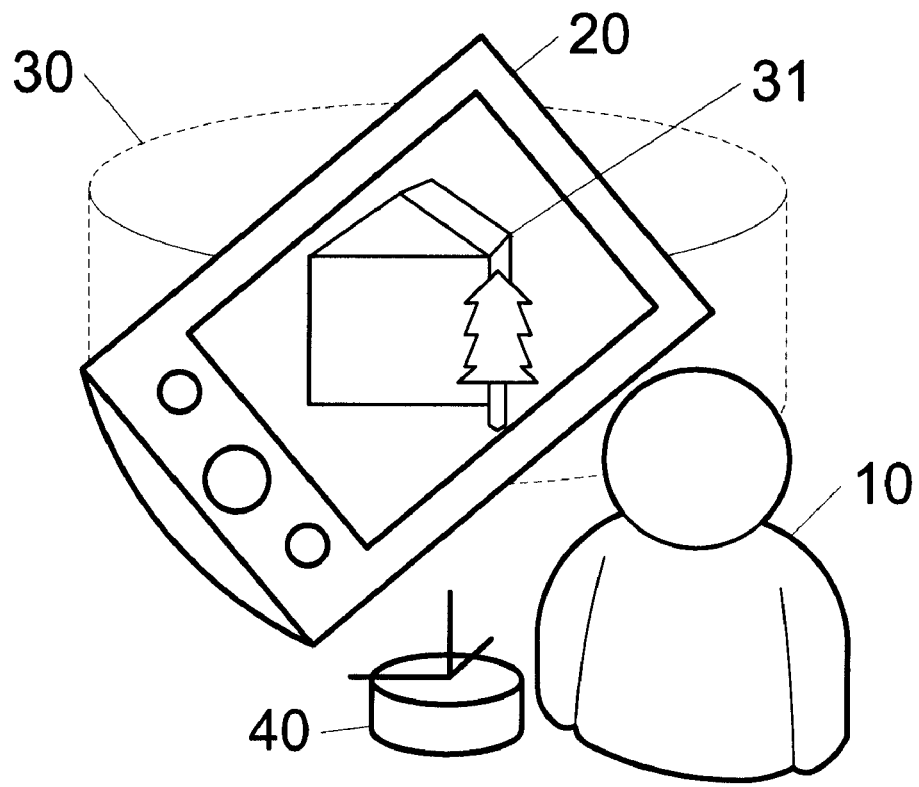
Figure 10:
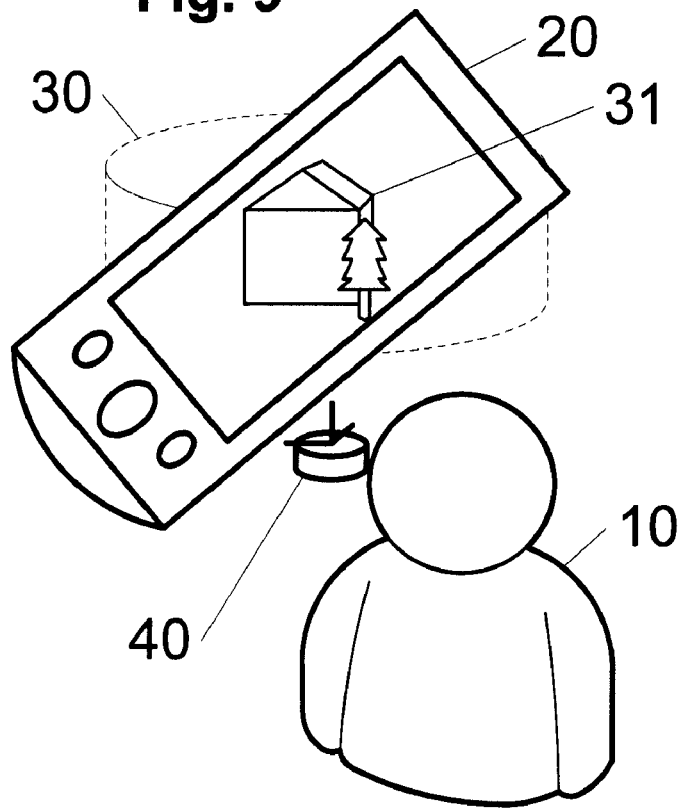
Figure 11:
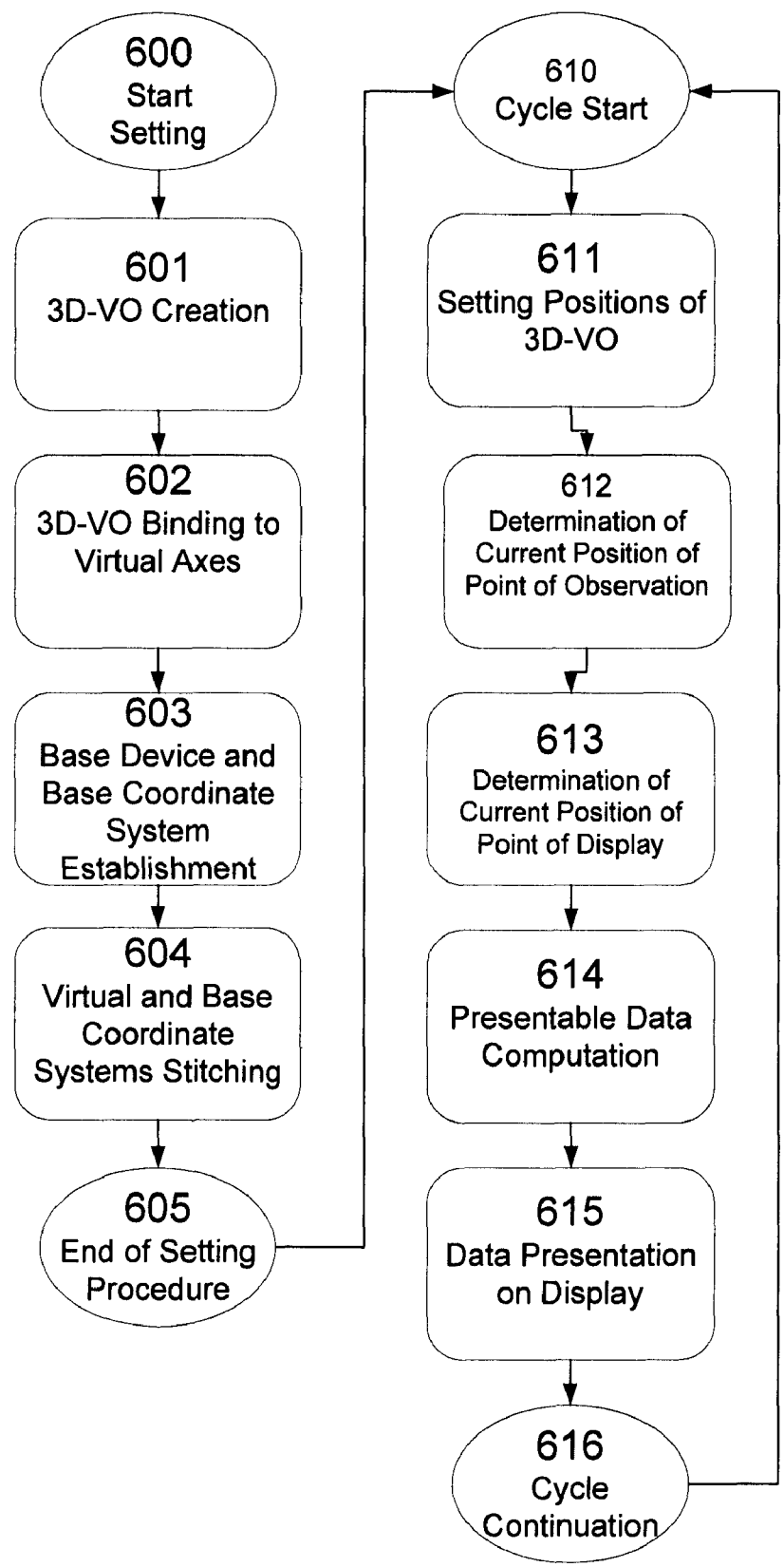

FIG. 1 presents the general concept of the method and system of visualization of three-dimensional objects of the virtual space, FIG. 2 shows the scheme of one of possible alternatives of locating the position of a receiving/transmitting device, FIG. 3 shows the scheme of sequential location of the position of the assemblage of receiving/transmitting devices, FIG. 4 demonstrates the procedure of setting the position of an observation point in relation to a receiving/transmitting device fixed on the user head, FIGS. 5 and 6 illustrate the process of observation of the effect of a three-dimensional virtual space, which effect is manifested due shifts of the mobile display unit, FIGS. 7 and 8 present the process of observation of the effect of a three-dimensional virtual space, which effect is manifested due to relocation of the user, FIGS. 9 and 10 demonstrate the process of observation of the effect of a three-dimensional virtual space, which effect is manifested at a turn and rotation of a mobile display unit, and also at the increase of the distance of the observer and mobile display unit from the base device and the three-dimensional virtual objects linked to it, FIG. 11 shows the block diagram of the algorithm for arranging, within the real space, and observing the virtual three-dimensional objects.

The system for visualization of three-dimensional objects located in the virtual space (see FIG. 1), is intended for application by the user 10 as a game device or a trainer-simulator and comprises the receiving/transmitting device (RTD) 11 fixed on the head of the user 10, the display unit 20 with a set of the receiving/transmitting devices 21 fixed on it, the virtual space 30 with three-dimensional virtual objects (3D-VO) 31, the base device 40 with base group 41 of RTD and the unit 42 of data preprocessing, the computer 50 with the unit 51 of processors and the unit 52 of memories.

The base group 41 of RTD includes, at least, three base RTD 43 of which the spatial locations are uniquely dependent on (linked with) the base system 44 of coordinates (BSC). The base group 41 of RTD is placed in the real space, thus forming (establishing), the base system 44 of coordinates (BSC) for the preset sector of the real space.

The virtual space 30 containing 3D-VO 31 constitutes a set of in advance created data describing the image of the three-dimensional virtual objects stored in the block 52 of the computer memory. Disposition of the 3D-VO 31 in the real space is performed by setting their coordinates 32 concerning the base system 44 of coordinates established in the real space. The coordinates of the 3D-VO 32 are also stored in the computer memory block 52.

By locating the signals 13 and 22, generated by the RTD 11 of the user 10 and by the RTD 21 of the display 20, the base device 40 determines the position of the sources of these signals concerning the BSC, and, through the channel 45 of data transfers transmits the coordinates of them to the computer 50 for further processing. The rough processing of the data regarding such location is performed, as a rule, in the block 42 of data processing by means of converting the measured distances from the RTD 11 of the user 10 and the RTD 21 of the display 20 to each base RTD 43 into the coordinates of the corresponding RTD concerning (regarding) the BSC.

By using the preset parameters of the shift of the point of observation (not shown on the FIG. 1) the computer 50 converts the coordinates of the RTD 11 of the users 10 to the coordinates of the point 12 of observation concerning the BSC. One of the possible methods of setting the parameters of such shift is shown on FIG. 4 and is described below.

Similarly, by using the preset parameters of the shift of the working zone of the display 20 (not shown on FIG. 1) the computer 50 converts the coordinates of the RTD 21 of the display 20 into the spatial coordinates of the working zone, for example, the plane of the screen of the display, concerning the BSC. Methods of setting the parameters of such shift are similar to the methods applied in setting the parameters of the shift of the point of observation concerning the RTD of the user.

The block 51 of the processors processes three-dimensional coordinates of the point 12 of observation and those of the working zone of the display 20 concerning the BSC along with the three-dimensional coordinates and the three-dimensional model (simulation) of the 3D-VO 31, also loaded from the block 52 of memory. On the basis of the results of processing, the block 51 of the processors composes a set of the represented data describing the objects, for the display 20 in the form of an assemblage of represented points of the 3D-VO 31, visible from the point 12 of observation. Each visible point of the 3D-VO 31 has a corresponding (matching) point on the plane of the display unit, the later point being located on the straight line 33 connecting the point 12 of observation and the matching visible point of the 3D-VO 31. The set of the represented data is transferred by the computer 50 to the display 20 through the channel 23 of data transfer for generating the image 24.

The position of the user's RTD in space is determined mainly by means of location (see FIG. 2). On the presented diagram the base group of RTD includes three elements—RTD 431, RTD 432 and RTD 433; their position, in the univocal manner, sets the position of the base system 44 of coordinates. The zero point of the base system 44 of coordinates should be preferably combined with one of the base RTD 431, whereas the other two devices—the RTD 432 and the RTD 433—should be preferably directed along the axes of the base system 44 of coordinates at a fixed distance from the RTD 431. Such position of the base RTD allows to simplify formulas of conversion of distances $D_1$, $D_2$ and $D_3$ determined in the process of location, (distances from the RTD 11 to the RTD 431, the RTD 432 and the RTD 433), into the three-dimensional coordinates X, Y and Z of the position of the RTD 11 concerning the base system 44 of coordinates at the fixed $L_x$ and $L_y$, equal to the distances from the RTD 431 to the RTD 433 and from the RTD 431 to the RTD 432, accordingly.

$$X = \frac{L_x^2 + D_1^2 - D_2^2}{2L_x}$$

$$Y = \frac{L_y^2 + D_1^2 - D_3^2}{2L_y}$$

$$Z = \sqrt{D_1^2 - X^2 - Y^2}$$

Determination of the position of each RTD 21 of the display 20 (at least, three RTD for determination of the position of the plane of the display) is carried out in a similar manner.

To ensure simultaneous location of the position of several RTD (see FIG. 3), operating within the ultrasound band it is expedient to apply the method of serial location of the positions of these RTD.

In that case, the composition of the base group 41 of RTD can include, along with the base RTD 43, the device 46 of generation of the serial sync pulses, producing the sequence 47 of sync pulses controlling the sequence of generation of signals of the RTD 11 of the user 10 and the RTD 21 of the display. In that case, the later devices include the receivers 111 and 211 of sync pulses and the transmitters 112, 212, 213 and 214 of the base signal. On the diagram presented on FIG. 3, a single receiver 211 of sync pulses controls three transmitters—212, 213 and 214 of the base signals, however, it is possible to equip each transmitter with its own receiver of the sync pulses.

After determination of the position of the RTD of the user it is necessary to determine the position of the point of observation (see FIG. 4). For this purpose the data on the shift 15 of the point 12 of observation concerning the RTD 11 of the user. Data on the shift 15, as a rule, are expressed in the form of a set of shifts along each axis of the base system 44 of coordinates set by the base device 40. On the diagram the shifts 15 along Z-axis, then along X-axis and along Y-axis are shown. The setting of the necessary data on the shift 15 is performed by, for example, the user 10 by means of a test 3D-VO (not shown on FIG. 4) after establishing the base system 44 of coordinates in the real space and placing the RTD 11 on the head of the user 10 by means of the hat 14 or its analog. For more exact determination of the position of a point of observation it is expedient to use two and more RTD 11 placed on the head of the user 10.

Let us consider the process of observation of the effect of a three-dimensional virtual space by the claimed method for a case of moving a mobile display unit from the initial position (see FIG. 5) to the final position (see FIG. 6). In this case, the fixed position is occupied by the base device 40, the base system 44 of coordinates, the virtual space 30 containing the 3D-VO 31, and also by the user 10. The position of the display 20 is changing, as can be seen on the diagrams. As shown on FIG. 5, the user 10 does not see the 3D-VO 31 because the display 20 is not between them, but is displaced to the right. FIG. 6 shows, that at presence of the display 20 between the user 10 and the 3D-VO 31, the display 20 shows the portion 312 of the 3D-VO visible to the user, whereas the other part 311 of this 3D-VO remains beyond the angle of vision of the user, this angle being restricted by the perimeter of the display 20, and, thus, remains invisible to the user 10.

Also, let us consider the process of observation of the effect of a three-dimensional virtual space by the claimed method for a case of the user moving from the initial position (see FIG. 7) to the final position (see FIG. 8). In this case the positions of the base device 40, the base system 44 of coordinates, the virtual space 30 containing the 3D-VO 31, as well as the position of the display 20, are fixed. The position of the user 10 changes as seen on the diagrams. As shown on FIG. 7, the user 10 observes the image of the 3D-VO 31 on the display 20, at that, the user is situated to the right of the base device 40 and sees the image of the front and right side of the 3D-VO 31. FIG. 8 shows, that if the user 10 moves to the left from the base device 40, the display 20 shows the image of the front and left side of the 3D-VO 31. At that, in moving from the initial position to the final position the user 10 observes, on the display 20, the gradual change of the image of the 3D-VO 31, corresponding to observation of the real three-dimensional objects through a window.

Let us consider the process of observation of the effect of a three-dimensional virtual space for the case of rotation of the display in one plane (see FIG. 9). In that case, the positions of the base device 40, the base system 44 of coordinates, the virtual space 30, the 3D-VO 31 and the user 10 remain constant, and the user 10 observes a normal position of the image of the 3D-VO 31 on the display.

Finally, let us consider the process of observation of the effect of a three-dimensional virtual space for the case of rotation of the display around the longitudinal axis with simultaneous increase of the distances of the user and the display from the base device (see FIG. 10). In that case, the constant positions are maintained by the base device 40, the base system 44 of coordinates, the virtual space 30, and the 3D-VO 31, only. The user 10 observes the normal image of the 3D-VO 31, however, the size of the said image is reduced in inverse proportion to the distance between the 3D-VO 31 and the user 10. At that, the rotation (twirl) of the display 20 around the longitudinal axis does not result in a change of the image of the 3D-VO visible by the user 31, due to distortion, in particular, extension of the normal image on the display 20 in the direction perpendicular to the spinning axis of the display 20.

The sequence of the operations performed for observation of the effect of a three-dimensional virtual space, is presented in the form of an algorithm (see FIG. 11). The steps 600 to 605 provide for placement, i.e. arrangement, of the three-dimensional virtual objects in the real space, and the steps 610 to 616 carried out in loop (cycle), provide for ability of observing the pre-arranged virtual three-dimensional objects in the real time mode.

For disposing the 3D-VO in the real space: the 3D-VO are created in the form of a set of data stored in the memory of the computer (step 601), the 3D-VO are linked to the virtual, arbitrary set axes in the computer (step 602), the base device and the corresponding base coordinate system are established in the real space (step 603), the virtual coordinate system (virtual axes) is combined with the base coordinate system using operations of shifting, rotation and scaling (step 604). As a result of accomplishment of the said operations, the three-dimensional virtual objects linked to the virtual axes, are placed in the real space and are accessible for observation by the user with the help of an adequate display unit (display).

To observe the 3D-VO in a cycle process: the current position of the 3D-VO is set for the case of dynamically changed position of the 3D-VO in the course of observation (step 611), the current position of the point of observation is determined through determination of the position of the RTD of the user and estimation of the shift of the point of observation concerning the RTD (step 612), the current position of the working zone of the display is determined through determination of the position of the RTD of the display with due account of the shift of the working zone of the display concerning the RTD (step 613), the presentable data for the current positions of the user, the display and the 3D-VO are computed (step 614), the presentable data are shown on the display (step 615).

As the result, the user observes, in the real time mode, the three-dimensional virtual objects placed in the real space on the display.

Generalizing the above description of the method of visualization of virtual three-dimensional objects and of a set of the devices used for implementation of the method, it is possible to declare, that, in essence, the method is characterized by accomplishing the operations of:

establishing the base coordinate system for the preset area of the real space by stationing, within this space, the base group of receiving/transmitting devices, which group sets the position of axes of the base coordinate system;

setting the positions of the pre-produced in the digital format three-dimensional objects of the virtual space concerning the base coordinate system to ensure their virtual presence at within the preset area of the real space;

determining the user observation point of the three-dimensional objects of the virtual space concerning the base coordinate system by locating the receiving/transmitting device fixed on the user head and by setting the position of the observation point concerning the receiving/transmitting device fixed on the user head;

determining the position of the display units engaged by the user, concerning the base coordinate system by means of location of the receiving/transmitting devices fixed on the display units and also by means of setting the positions of working zones (active areas) of the display units concerning the receiving/transmitting devices fixed thereon;

generating a set of presented (displayed) data regarding the three-dimensional objects of virtual space, proceeding from the information regarding the positions of the three-dimensional objects of the virtual space concerning the base coordinate system, the information regarding the position of the observation point concerning the base coordinate system and the information regarding the positions of the displays engaged by the user concerning the base coordinate system;

displaying (presenting) the three-dimensional objects of the virtual space on the display units engaged by the user, proceeding from the generated set of presented (displayed) data.

Apart from that, the description of the method assumes, that for formation of the basic element in the form of the base coordinate system, it is necessary to use, at least, three receiving/transmitting devices with their preset mutual location and the preset position of axes of the base coordinate system concerning the said receiving/transmitting devices.

For the claimed method it is essential, that the position, in the virtual space, of the pre-produced digital three-dimensional objects, concerning the base coordinate system was set by means of accomplishing the following operations of:

setting, by means of a software, the spatial position and orientation concerning the virtual coordinate system set for the specified database of the three-dimensional objects, in respect of each three-dimensional object contained in the computer database of the pre-produced three-dimensional objects of the virtual space;

setting the orientation of the axes of the virtual coordinate system concerning the base coordinate system;

setting the factors (coefficients) of conformity of the scale of the virtual coordinate system and the scale of the base coordinate system along each axis;

calculate the spatial position and orientation of each three-dimensional object contained in the database of the three-dimensional objects concerning the base coordinate system, with due regard of the position of the intersection point of axes of the virtual coordinate system concerning the base coordinate system, the orientation of axes of the virtual coordinate system concerning the base coordinate system and the factors of conformity of the scale of the virtual coordinate system and that of the base coordinate system along each axis.

As the step of determining the position of the point of observation, by the user, of the three-dimensional objects of the virtual space concerning the base coordinate system, is essential for the claimed method, it is necessary, within the scope of the claimed method, to carry out the following operations of:

affixing a receiving/transmitting device on the user head;

setting the position of the user observation point of the three-dimensional objects of virtual space concerning the position of the receiving/transmitting device affixed on the user head;

determining, by means of location, the distances between the receiving/transmitting device affixed on the user head, and each receiving/transmitting device belonging to the set of receiving/transmitting devices constituting the base coordinate system;

computing, on the basis of the information on the distances between the said receiving/transmitting device and each receiving/transmitting device of the set of receiving/transmitting devices constituting the base coordinate system, the position of the receiving/transmitting device affixed on the user head, concerning the base coordinate system;

computing, on the basis of the information on the position of the receiving/transmitting device affixed on the user head concerning the base coordinate system and the information on the position of the user observation point of the of three-dimensional objects of virtual space concerning the position of the receiving/transmitting device affixed on the user head, the position of the user observation point of the of three-dimensional objects of the virtual space concerning the base coordinate system.

The important element of a claimed method is constituted by the process of the preliminary adjustment, i.e. the adjustment of the assemblage of the elements implementing the method. In particular, to enhance the accuracy of determination of the position of the point of observation, by the user, of the three-dimensional objects of the virtual space concerning the base coordinate system and the setting of the position of the point of observation, by the user, of three-dimensional objects of the virtual space concerning the position of the receiving/transmitting device affixed on the head of the user, is performed by means of applying a test three-dimensional object of the virtual space.

Besides, it is expedient for raising the accuracy of determination of the position of the point of observation, by the user, of the three-dimensional objects of the virtual space concerning the base coordinate system, to use, at least, two receiving/transmitting devices, affixed on the head of the user.

For the claimed method it is essential that determination of the position of each display engaged by the user, concerning the base coordinate system, that the following operations were performed:

affixing, on the display unit, a set of the receiving/transmitting devices, comprising, at least, three receiving/transmitting devices;

setting the position of the working (active) zone of the display unit concerning the set of the receiving/transmitting devices affixed on the said display unit;

determining, by means of location, the distances between each receiving/transmitting device affixed on the display unit, and each receiving/transmitting device of the set of the receiving/transmitting devices constituting the base coordinate system;

computing, on the basis of information on distances between the receiving/transmitting devices affixed on the display unit, and the receiving/transmitting devices of the set of the receiving/transmitting devices constituting the base coordinate system, the position of the receiving/transmitting devices affixed on the display unit, concerning the base coordinate system;

computing, on the basis of information on the position of the set of the receiving/transmitting devices affixed on the display unit, concerning the base coordinate system, and information on the position of the working (active) zone of the display unit concerning the set of the receiving/transmitting devices affixed on the display unit, the position of the working (active) zone of the display unit concerning the base coordinate system.

Also, it is expedient for increasing the accuracy of determination of the position of each display engaged by the user, concerning the base coordinate system, that setting the position of the working zone of the display concerning the group of the receiving/transmitting devices affixed on the display, was carried out by the user himself with application of the test three-dimensional object of the virtual space.

The claimed method is also capable of additional setting the form (shape) of the surface of the working zone of the display.

Aside from this, determination of the set of the presented data on the three-dimensional objects of the virtual space requires performance of the following operations:

establishing a spatial angle of observation with the center in the user point of observation of the three-dimensional objects, where the generatrix of the spatial angle, passing (transient) through the points of the perimeter of the working zone of the display unit, of which the coordinates are determined concerning the base coordinate system;

determining a set of visible points of the three-dimensional objects of the virtual space as an assemblage of the points located within the spatial angle of observation and located on the proximal, to the user, surfaces of the three-dimensional objects of the virtual space, with due regard of the preset transparency factors;

determining a set of the presented (displayed) data on the three-dimensional objects of the virtual space as an assemblage of the points located on the surface of the working zone of the display unit, of which the color and luminance correspond to the color and luminance of matching points in the set of visible points of the three-dimensional objects of the virtual space, which points are located on a straight line connecting the point of observation, a point on the surface of the working zone of the display unit and a point in the set of the visible points of the three-dimensional objects of the virtual space.

As can be understood from the above drawings and the description, the implementation of the method requires the presence of a system of visualization of the three-dimensional objects of the virtual space, comprising a base device consisting of a base group of receiving/transmitting devices composing the base coordinate system, and a processing unit, a receiving/transmitting device fixed on the head of a user, a display, a group of the receiving/transmitting devices fixed on the display, and a computer, at that, the receiving/transmitting devices fixed on the head of the user and those fixed on the display use the common communication channel with the base group of the receiving/transmitting devices; each group of the receiving/transmitting devices includes, at least, three receiving/transmitting devices, the base group of the receiving/transmitting devices rigidly fixes the relative position of each receiving/transmitting device of the group; the display is a flat display, the processing unit enabling synchronization of the work of the receiving/transmitting devices, the pre-processing of the signals, the analog-digital conversion of the signals, the computation of the coordinates and switching with the computer; the computer comprises a memory block storing the data on the features and coordinates of the three-dimensional objects of the virtual space, and a block of processors for processing the information on the positions of the point of observation, of the display and of the three-dimensional objects of the virtual space, which processor computes the set of presented data and controls the data output to the display, and the software (programs) for processing the information on the positions of the point of observation, of the display unit and of the three-dimensional objects of the virtual space.

For embodiment of the system it is essential that the base group of the receiving/transmitting devices contained a device for generation of the serial sync pulses controlling the sequence of signal generation by the receiving/transmitting devices fixed on the user head and on the display, including the receivers of sync pulses and the transmitters of the base signal. At that, such devices for generation and reception of the sync pulses are expedient for operating in the microwave (radio) band, and the devices for generation and reception of the base signal for operation in the ultrasonic band.

In the applied alternatives of the claimed method an opportunity exists for implementing the algorithms of the active reaction of the objects of the virtual space on movements of the observer or the display. So, for example, the virtual character of a computer game can "see" the observer and "hide" from him behind a virtual tree. Such alternatives are quite efficient, though they go beyond the claimed method of visualization, in providing the active interaction between the real and the virtual objects.

Implementation of the claimed method creates the effect of observation of the surrounding space through a mobile window, which shows more, than it is possible to see with a naked eye. At that, the claimed invention differs from other inventions in the area of providing the effect of a stereoscopic picture by that it does not involve the effect of a binocular sight, as the claimed effect is manifested even at observation of an object by one eye; for creation of the effect no special devices are required to visualize the image, as the effect is manifested even on the common computer monitor; for observation of the effect the position of the observer is not essentially restricted, as the effect is manifested within the wide angular and distance range.

The invention claimed is:

1. A method of visualization of three-dimensional virtual objects in virtual space, the method comprising:
  (a) establishing a base coordinate system for a defined area of real space by placing, within the real space, a base group of ultrasonic transceivers that defines axes of a base coordinate system;
  (b) setting positions of the virtual objects in the virtual space relative to the base coordinate system to ensure their virtual presence within the defined area;
  (c) determining an observation point of a user relative to the virtual objects and the base coordinate system by locating a head ultrasonic transceiver mounted on a head of a user and by setting a position of the observation point of the head ultrasonic transceiver;

(d) determining positions of multiple display units viewed by the user relative to the base coordinate system by locating ultrasonic transceivers mounted on the display units and by setting the positions of active areas of the display units relative to the ultrasonic transceivers mounted thereon;

(e) determining a position of the head ultrasonic transceiver relative to the base coordinate system based on distances between the head ultrasonic transceiver and transceivers of the base coordinate system;

(f) determining positions of the transceivers mounted on the display units relative to the base coordinate system based on distances between each transceiver mounted on the display unit and transceivers of the base coordinate system;

(g) analyzing data regarding positions of the virtual objects in the virtual space based on the positions of the virtual objects in the virtual space relative to the base coordinate system, the observation point and the positions of the multiple displays relative to the base coordinate system;

(h) displaying the virtual objects on the multiple display units based on the analyzed data, the positions of the head ultrasonic transceiver and the positions of the transceivers mounted on the display units.

2. The method of claim 1, further comprising utilizing at least three ultrasonic transceivers to establish the base coordinate system and to establish at least three axes of the base coordinate system relative to the ultrasonic transceivers.

3. The method of claim 1, further comprising the following operations for setting the positions of the virtual objects relative to the base coordinate system:

(a) setting, in software, the spatial position and orientation of a virtual coordinate system corresponding to database of the virtual objects;

(b) setting orientation of the axes of the virtual coordinate system relative to the base coordinate system;

(c) setting coefficients of conformity of a scale of the virtual coordinate system and the scale of the base coordinate system along each axis;

(d) calculating position and orientation of each virtual object in the database relative to the base coordinate system, an origin of the base coordinate system, the orientation of axes of the virtual coordinate system and the coefficients of conformity.

4. The method of claim 1, further comprising the following steps to determine the observation point:

(a) mounting the head ultrasonic transceiver on the head of the user;

(b) setting the position of the observation point relative to the virtual objects;

(c) calculating, based on the position of the head ultrasonic transceiver relative to the base coordinate system and based on the position of the observation point, the position of the observation point relative to the virtual objects and relative to the base coordinate system.

5. The method of claim 4, further comprising utilizing a test virtual object in the virtual space to increase accuracy in determining the observation point.

6. The method of claim 4, further comprising utilizing at least two head ultrasonic transceivers mounted on the head of the user to increase accuracy in determining the observation point.

7. The method of claim 4, further comprising utilizing at least three head ultrasonic transceivers mounted on the head of the user to determine the observation point.

8. The method of claim 1, further comprising performing the following steps to determine the position of each of the multiple display units:

(a) mounting at least three ultrasonic transceivers on each display unit;

(b) setting the position of the active areas of each display unit relative to the transceivers mounted on the corresponding display unit;

(c) calculating, based on the positions of the transceivers mounted on the display units positions of the active areas of the display units relative to the base coordinate system.

9. The method of claim 8, further comprising utilizing a test virtual object in the virtual space to increase accuracy in determining the positions of the ultrasonic transceivers mounted on the display units.

10. The method of claim 9, wherein the test virtual object permits improving accuracy of locating the active areas.

11. The method of claim 1, further comprising performing the following steps to determine displayed data of the virtual objects:

(a) establishing a solid angle of observation with an origin at the point of observation, where the generatrix of the solid angle passes through points of the perimeter of the working area of at least one of the display units;

(b) determining a set of visible points of the virtual objects that are located within the solid angle and on the proximal surfaces of the virtual objects relative to the user;

(d) determining a set of displayed data of the virtual objects as a set of of the points located on a surface of the working area of at least one display unit, wherein color and luminance of the working area corresponds to color and luminance of matching points in the set of visible points, wherein the visible points are located on a straight line connecting the point of observation, a point on the surface of the working area and one of the visible points.

12. A system for visualization of three-dimensional virtual objects, comprising:

a plurality of ultrasonic transceivers forming a base coordinate system;

a data processing unit coupled to the plurality of ultrasonic transceivers;

a head ultrasonic transceiver mounted on a head of a user;

a plurality of display units, each having at least three ultrasonic transceivers mounted thereon;

a computer exchanging data with the data processing unit, the plurality of ultrasonic transceivers and the head ultrasonic transceiver through a common communication channel;

the plurality of ultrasonic transceivers determining a fixed position of each display unit relative to the base coordinate system;

the data processing unit providing (a) synchronization of the ultrasonic transceivers, (b) signal preprocessing;

(c) analog-digital signal conversion; and (d) determining a position of the head ultrasonic transceiver relative to the base coordinate system based on distances between the head ultrasonic transceiver and transceivers of the base coordinate system;

(f) determining positions of the transceivers mounted on the display units relative to the base coordinate system based on distances between each transceiver mounted on the display unit and transceivers of the base coordinate system;

the computer providing:
(i) storage of features and coordinates of the virtual objects,
(ii) processing of location of an observation point of a user, of the display units and the virtual objects, and
(iii) control of data output onto the display units based on the positions of the head ultrasonic transceiver and the positions of the transceivers mounted on the display units.

13. The system of claim 12, further comprising a pulse generator for generation of serial synchronizing pulses controlling the sequence of signal generation by the ultrasonic transceivers.

14. The system of claim 13, wherein the pulse generator operates in a radio-frequency range.

15. The system of claim 13, wherein the pulse generator operates in an infrared range.

* * * * *